US012537147B2

(12) United States Patent
Nguyen et al.

(10) Patent No.: US 12,537,147 B2
(45) Date of Patent: Jan. 27, 2026

(54) BIT RATE-ADAPTING RESOSWITCH

(71) Applicant: THE REGENTS OF THE UNIVERSITY OF CALIFORNIA, Oakland, CA (US)

(72) Inventors: Clark T.-C. Nguyen, Oakland, CA (US); Qiutong Jin, Albany, CA (US); Kevin Zheng, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 245 days.

(21) Appl. No.: 18/531,505

(22) Filed: Dec. 6, 2023

(65) Prior Publication Data

US 2024/0203669 A1 Jun. 20, 2024

Related U.S. Application Data

(60) Provisional application No. 63/386,310, filed on Dec. 6, 2022.

(51) Int. Cl.
*H01H 1/00* (2006.01)

(52) U.S. Cl.
CPC .................................. *H01H 1/0036* (2013.01)

(58) Field of Classification Search
CPC ...... H01H 1/00; H01H 1/0036; H01H 1/0094; H01H 2001/0052; H01H 2001/0057;
(Continued)

(56) References Cited

U.S. PATENT DOCUMENTS 4,674,180 A * 6/1987 Zavracky ............. H01H 1/0036 216/6
6,577,040 B2 * 6/2003 Nguyen ................. H03H 9/462 310/309
(Continued)

FOREIGN PATENT DOCUMENTS

WO 2005117051 A1 12/2005
WO 2014047383 A1 3/2014
(Continued)

OTHER PUBLICATIONS

Korean Intellectual Property Office (KIPO), International Search Report and Written Opinion issued Jul. 11, 2017, related PCT international application No. PCT/US2017/029769, pp. 1-10, with claims searched, pp. 11-17.
(Continued)

*Primary Examiner* — James M Perez
(74) *Attorney, Agent, or Firm* — O'BANION & RITCHEY LLP; John P. O'Banion

(57) ABSTRACT

A micromechanical resoswitch design and operation mode harnesses stored mechanical resonance energy to reduce its required switching energy and improve achievable bit rate in the example to 8 kbps, which is at least 12 times faster than without pre-energization. The use of stored energy is instrumental to achieving switching times 8 times faster than previously demonstrated, breaking the Q-driven sensitivity-bit rate tradeoff often assumed for these devices and overcoming long-held (incorrect) assumptions. The resoswitch adapts to the required bit rate, adjusting its switching time to accommodate a fast or slow rate, greatly expanding the application space.

20 Claims, 9 Drawing Sheets

(58) Field of Classification Search
CPC ... H01H 2001/0063; H01H 2001/0073; H01H 2001/0078; H01H 2001/0084; H01H 59/00; H01H 59/0009; H01H 2059/0027; H01H 2059/0036; H01H 2059/0045; H01H 2059/0054; H01H 2059/0081
See application file for complete search history.

(56) References Cited

U.S. PATENT DOCUMENTS

| | | | | |
|---|---|---|---|---|
| 6,713,938 | B2 * | 3/2004 | Nguyen | H03H 3/0078 333/197 |
| 6,819,246 | B1 * | 11/2004 | Seppa | G06K 19/0717 310/313 C |
| 8,058,940 | B1 * | 11/2011 | Quevy | H03B 21/01 333/197 |
| 8,168,120 | B1 * | 5/2012 | Younis | G01N 29/022 422/68.1 |
| 8,826,529 | B2 * | 9/2014 | Detor | C25D 5/022 29/829 |
| 9,016,124 | B1 * | 4/2015 | Younis | G01P 15/0891 73/514.16 |
| 9,053,874 | B2 * | 6/2015 | Rogers | H01H 59/0009 |
| 9,077,060 | B2 * | 7/2015 | Nguyen | H01H 50/005 |
| 9,431,201 | B2 * | 8/2016 | Nguyen | H02M 3/07 |
| 9,613,770 | B2 * | 4/2017 | Rogers | H01H 1/0036 |
| 9,708,176 | B2 * | 7/2017 | Thompson | B81B 3/0086 |
| 9,853,679 | B2 * | 12/2017 | Nguyen | H03H 9/2436 |
| 10,257,002 | B2 * | 4/2019 | Nguyen | H04B 1/713 |
| 10,345,332 | B2 * | 7/2019 | Bernstein | H01H 1/0036 |
| 10,867,757 | B2 * | 12/2020 | Nguyen | H03H 9/462 |
| 11,158,783 | B2 * | 10/2021 | Rinaldi | H10N 30/804 |
| 11,726,276 | B1 * | 8/2023 | Wood | G02B 6/43 385/31 |
| 2001/0033121 | A1 * | 10/2001 | Nguyen | H03H 9/24 310/316.01 |
| 2002/0021054 | A1 * | 2/2002 | Nguyen | H03H 3/0078 310/309 |
| 2004/0000696 | A1 * | 1/2004 | Ma | B81B 3/007 257/420 |
| 2005/0062653 | A1 * | 3/2005 | Cetiner | H01Q 1/38 343/700 MS |
| 2005/0074209 | A1 * | 4/2005 | Baumann | G02B 6/12007 385/50 |
| 2005/0252308 | A1 * | 11/2005 | Hjelt | G01P 15/06 73/862.041 |
| 2006/0132891 | A1 * | 6/2006 | Kim | H01H 59/0009 359/291 |
| 2007/0096847 | A1 * | 5/2007 | Trutna | H04B 1/69 333/133 |
| 2008/0078662 | A1 * | 4/2008 | Naito | H01H 59/0009 200/181 |
| 2010/0140066 | A1 * | 6/2010 | Feng | H01H 1/0094 200/181 |
| 2010/0263997 | A1 * | 10/2010 | Hilgers | H01H 61/02 200/181 |
| 2011/0067984 | A1 * | 3/2011 | Nguyen | H01H 1/0036 200/181 |
| 2013/0134528 | A1 * | 5/2013 | Nguyen | H01H 59/0009 257/415 |
| 2013/0249649 | A1 * | 9/2013 | Kawai | H03H 9/172 333/187 |
| 2014/0076699 | A1 * | 3/2014 | Rogers | H01H 49/00 29/25.35 |
| 2014/0262707 | A1 * | 9/2014 | Pawashe | H10D 62/121 200/181 |
| 2015/0021149 | A1 * | 1/2015 | Sun | H01H 1/10 200/275 |
| 2015/0228430 | A1 * | 8/2015 | Rogers | H01H 59/0009 29/622 |
| 2016/0155595 | A1 * | 6/2016 | Nguyen | H03H 9/2436 327/536 |
| 2017/0059666 | A1 * | 3/2017 | Horsley | G01R 33/0385 |
| 2017/0102263 | A1 * | 4/2017 | Bernstein | H01H 1/0036 |
| 2017/0126263 | A1 * | 5/2017 | Rinaldi | H10N 30/40 |
| 2017/0141810 | A1 * | 5/2017 | Nguyen | H03F 3/45659 |
| 2018/0145853 | A1 * | 5/2018 | Nguyen | H04L 27/152 |
| 2019/0157015 | A1 * | 5/2019 | Nguyen | H03H 9/462 |
| 2024/0203669 | A1 * | 6/2024 | Nguyen | H04L 27/12 |
| 2024/0405519 | A1 * | 12/2024 | Clarke | H10D 89/911 |

FOREIGN PATENT DOCUMENTS

| | | | |
|---|---|---|---|
| WO | 2015030898 | A2 | 3/2015 |
| WO | 2015179407 | A1 | 11/2015 |

OTHER PUBLICATIONS

Lin, Yang, et al., "A resonance dynamical approach to faster, more reliable micromechanical switches", 2008 IEEE International Frequency Control Symp., May 19-21, 2008, pp. 640-645.

Lin, Yang, et al., "Polycide contact interface to suppress squegging in micromech. resoswitches", Technical Digest, The 27th IEEE International Conference on Micro Electro Mechanical Systems, Jan. 26-30, 2014, pp. 1-4.

Liu, Ruonan, et al., "Zero quiescent power VLF mechanical communication receiver", 2015 Transducers—2015 18th International Conference on Solid-State Sensors, Actuators and Microsystems, 2015, pp. 129-132.

Tang, William C., et al., "Laterally Driven Polysilicon Resonant Microstructures", Sensors and Actuators, vol. 20, 1989, pp. 25-32.

Clark, John R., et al., "Measurement Techniques for Capacitively-Transduced VHF-to-UHF Micromechanical Resonators", Digest of Technical Papers, the 11th Int. Conf. on Solid-State Sensors & Actuators (Transducers'01), Munich, Germany, Jun. 10-14, 2001, pp. 1118-1121.

* cited by examiner

BIT RATE-ADAPTING RESOSWITCH

CROSS-REFERENCE TO RELATED APPLICATIONS

This application claims priority to, and the benefit of, U.S. provisional patent application Ser. No. 63/386,310 filed on Dec. 6, 2022, incorporated herein by reference in its entirety.

This application is related to U.S. Pat. No. 10,867,757 issued on Dec. 15, 2020 and incorporated herein by reference in its entirety.

STATEMENT REGARDING FEDERALLY SPONSORED RESEARCH OR DEVELOPMENT

This invention was made with Government support under grant number 1809319, awarded by the National Science Foundation. The Government has certain rights in the invention.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to resonant mechanical switches, and more particularly to a pre-energization mechanism for decreasing switching times of resonant mechanical switches.

2. Background Discussion

Micromechanical resonant switches, also referred to as resoswitches, provide for transferring charge from pole to throw by impacting a conductive resonant vibrating structure against a conductive receive electrode. Resoswitches have a number of advantages over conventional non-resonant counterparts. Specifically, since they harness resonance dynamics, they require considerably smaller actuation power than non-resonant switches, making possible the reception of very low power wireless signals. In addition, amplification of displacements at resonance permits the use of geometries with substantially higher restoring stiffnesses than conventional Micro-Electro-Mechanical (MEMS) switches, contributing to improved reliability.

Furthermore, the use of impulsive contact forces allows for low instantaneous contact resistance to be achieved over short contact periods, and these advantages contribute to rapid charging speed and additional reliability enhancements. Finally, since they operate at resonance, these switches provide an inherent frequency selectivity as required for performing multiplexed communications.

The above characteristics of resoswitches have made possible the first all-mechanical communication receiver capable of receiving and demodulating very-low-frequency (VLF) FSK-modulated signals at 1 kbps with −60 dBm sensitivity, while consuming zero standby power when in a listening mode. The benefits of being able to listen continuously without consuming power makes this all-mechanical receiver especially attractive for applications that require only infrequent data reception, while remaining continuously attentive over extended periods of time, such as a year, or even a century, or more. Numerous applications are arising which may benefit from this technology. For example, one such application involves the tracking of clothing in the rented fashion industry. Here, a passive receiver is attached to clothing that can listen for decades, draining its power supply only on the rare reception of new data—perhaps transmitted across a continent at VLF.

While compelling, the use of high Q resonance to enable sensing of very low power and low frequency wireless signals generates skepticism regarding the ultimate bit rate of this receiver. It should be appreciated that the number of oscillations required for the resonator of a resoswitch to reach a displacement amplitude which exceeds its impact switch threshold increases with increases in device Q, of the resoswitch, one would expect switching time to increase with increasing Q, which then reduces the bit rate. In essence, one expects a trade-off between sensitivity (which improves with increasing Q) and bit rate (which slows as Q increases).

Accordingly, a need exists for a resoswitch technology which can operate at higher switching speeds and over a range of switching speeds. The present disclosure fulfills that need and provides additional benefits over existing systems.

BRIEF SUMMARY

This disclosure describes a pre-energization method to increase the switching speed of a resonant mechanical switch, referred to as a resoswitch, that allows the device to be operated at higher bit rates, while it adapts for operation across a range of bit rates. Specifically, the present disclosure describes a micromechanical resoswitch design and operation mode that harnesses stored mechanical resonance energy to reduce its required switching energy, while simultaneously reducing the required switching time to support a demonstrated bit rate of 8 kbps, which is at least 12 times faster than without pre-energization. And it is expected that the technique may be applied to reduce switching time even further. The use of stored energy in this resoswitch operation is instrumental toward achieving these switching times which are eight times faster than previously demonstrated, breaking the Q-driven sensitivity-bit rate tradeoff often assumed for these devices and debunking long-held, though incorrect, assumptions that this trade-off constrains the bit rate. The resoswitch actually adapts to the required bit rate, adjusting its switching time to accommodate a fast or slow rate, thus expanding the range of possible applications.

The demonstration that resoswitch receivers can in fact achieve reasonable bit rate communications despite their high Q expands the breadth of applications for resoswitches beyond label updates, tagging, or timing synchronization, to include applications requiring higher data rates, such as wireless audio reception and transcontinental firmware updates from a central location, perhaps using the same 60-kHz WWVB channels as used for transcontinental radio-set clocks. Other potential applications include tracking of products, such as for the rented clothing industry, and energy grid regulation, where the zero-power listening capability of resoswitches allows for energy grid monitoring and control of air conditioners home-by-home (from a central wireless location) to ensure that power demands do not exceed grid capacity.

Potential uses of the technology include, but are not limited to, the following. (1) Transcontinental clock synchronization anytime during the day, unlike present radio-controlled clocks that must limit synchronization (usually to once per day) to conserve battery power. (2) Transcontinental remote labeling for all manner of products, from soup cans to cleaning products and a plethora of other applications. In these instances, for example, Electronic-Ink (E-ink) could be utilized to realize zero-static power changeable labels, while a resoswitch receiver is used to receive data to change the labels across an entire continent. (3) Tracking and routing of products that change hands often (highly traded), such as arises in the rented fashion industry. (4) In view of the faster bit rates enabled by the disclosed technology, it should be appreciated that a wide range of communication applications that demand extremely low power consumption, can now be explored.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

Figure 1:
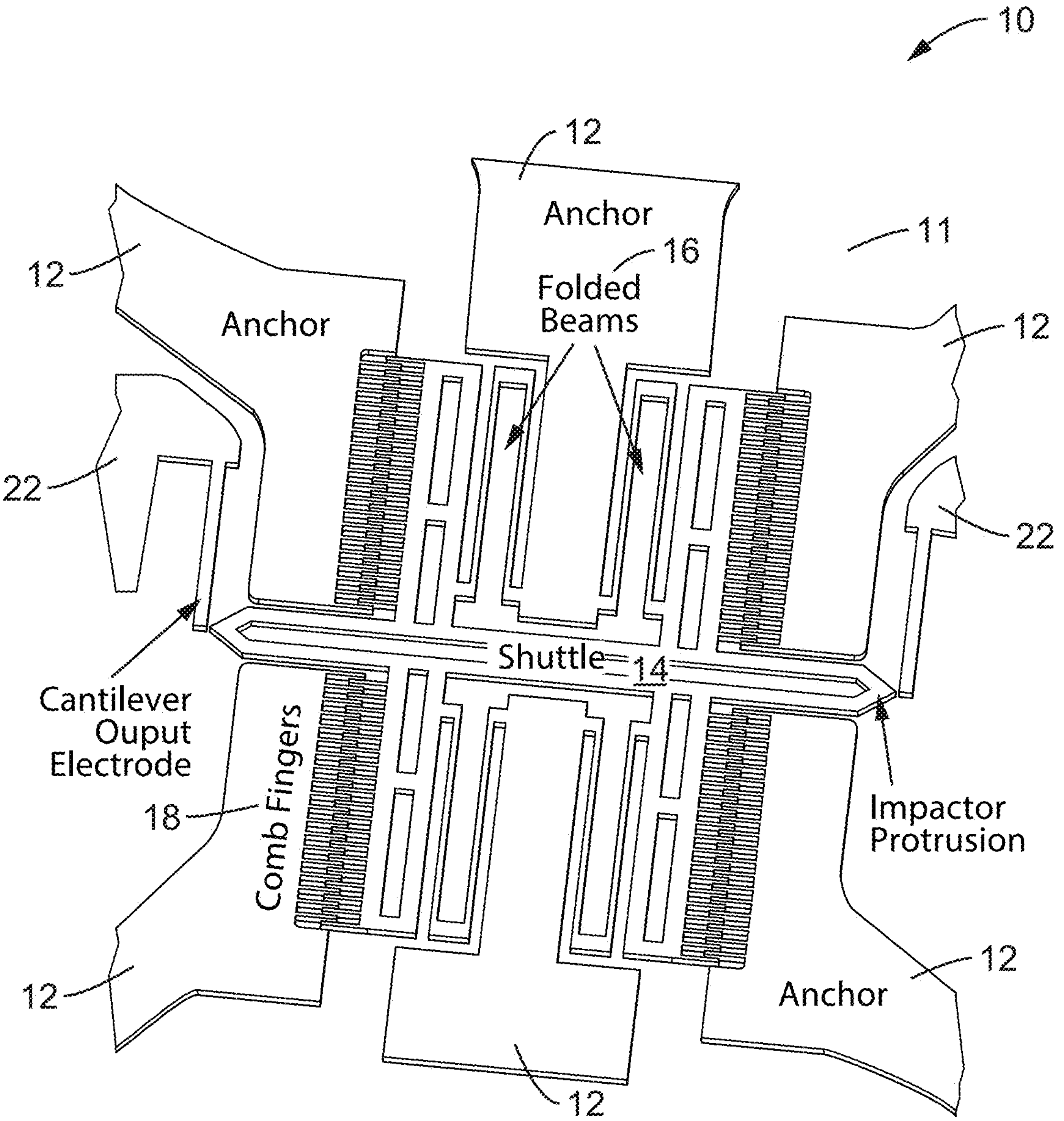
FIG. 1 is a rendering of a fabricated resoswitch utilized according to at least one embodiment of the present disclosure.

1. Introduction.

This disclosure demonstrates the design and operation of a resoswitch to strategically harness the energy storage nature of the device toward reducing switching time for accommodating higher bit rates, allowing adaption to desired bit rates. The interoperation between device design and input modulation provides for maintaining a resoswitch in a pre-energized state to lower the measured response time of the device from 1.58 ms to 0.048 ms, which is a 32 times shorter interval than the theoretical expectation based on the device Q of 502. This thirty-two fold reduction in response time then permits a bit rate up to 20 kbps (or higher), which is 20 times faster than those currently demonstrated. This increased data rate opens the disclosed resoswitch to be considered in a much wider swath of applications that might soon include things like transcontinental firmware updates from a central location. The resoswitch in the examples herein is described by way of example and not limitation, as the present disclosure applies to a range of resoswitch forms.

In the present disclosure describes a way of operating the resoswitch to harness the stored energy in the resoswitch to lower switching time and thereby provide higher bit rates. The principle concept is to ensure that the input waveform received by the resoswitch is one that maintains motion of the resoswitch at all times, even during periods when a '0' is received; and runs counter to the mode of operation described in previous resoswitch disclosures.

The present disclosure is configured to communicate from the transmitter to the resoswitch by modulating a carrier, which is at the resonant frequency of the resoswitch. These frequencies are said to match when the frequency received is sufficiently close to the resonance frequency that it amplifies the displacement amplitude significantly over a DC (or zero frequency) displacement. It should be appreciated that modulating the carrier can be performed in regard to frequency (FSK), Amplitude (ASK), On/Off Keying (OOK) (CW), and other variations without departing from the teachings of the present disclosure. Accordingly, the transmitter of the present disclosure may be utilized with different types of received waveforms, insofar as they are configured so that the resoswitch continues oscillating, for example even when a '0' bit is being received. In any of these modulated carriers, the '0' bit lengths must be sufficiently short that the resoswitch is still moving at the end of the '0' bit period. In addition, encoding can be utilized to ensure that there are never an excessive number of '0's in a row; for example, such as using a phase encoding (PE) technique, for example Manchester encoding.

Thus, the present disclosure describes a method of operation in which the resonator is still kept in sufficient motion during '0' inputs up to when a '1' input arrives. When the '1' arrives, the resoswitch possesses sufficient stored energy, to allow it to reach the impact threshold far more readily, that if it were commencing a new resonant startup sequence. This condition of sufficient motion during '0' inputs can arise in response to input waveform choice, and/or it may also be arrived at in response to resoswitch design choices, such as selecting a resoswitch with a very high Q, which results in the resoswitch continuing to oscillate without input energy for much longer. It should be noted that in conventional resoswitch operations, having a high Q limits the bit rate as it requires longer for the shuttle of the device to settle back down to its static state (no movement).

It should be appreciated that reducing the '0' time span is not an obvious change, in view of the commonly accepted view of trading off bit rate versus sensitivity. In addition, system designers most concerned about bit rate are generally focused on non-resonant digital systems, where resonance energy storage is not present. It should be appreciated that the teachings of the present disclosure may also be applied even to resonant switching of electronic systems, biosystems, chemical systems, and so forth, which would utilize the stored resonance energy to reduce switching times.

2. Device Structure and Operation

Figure 2:
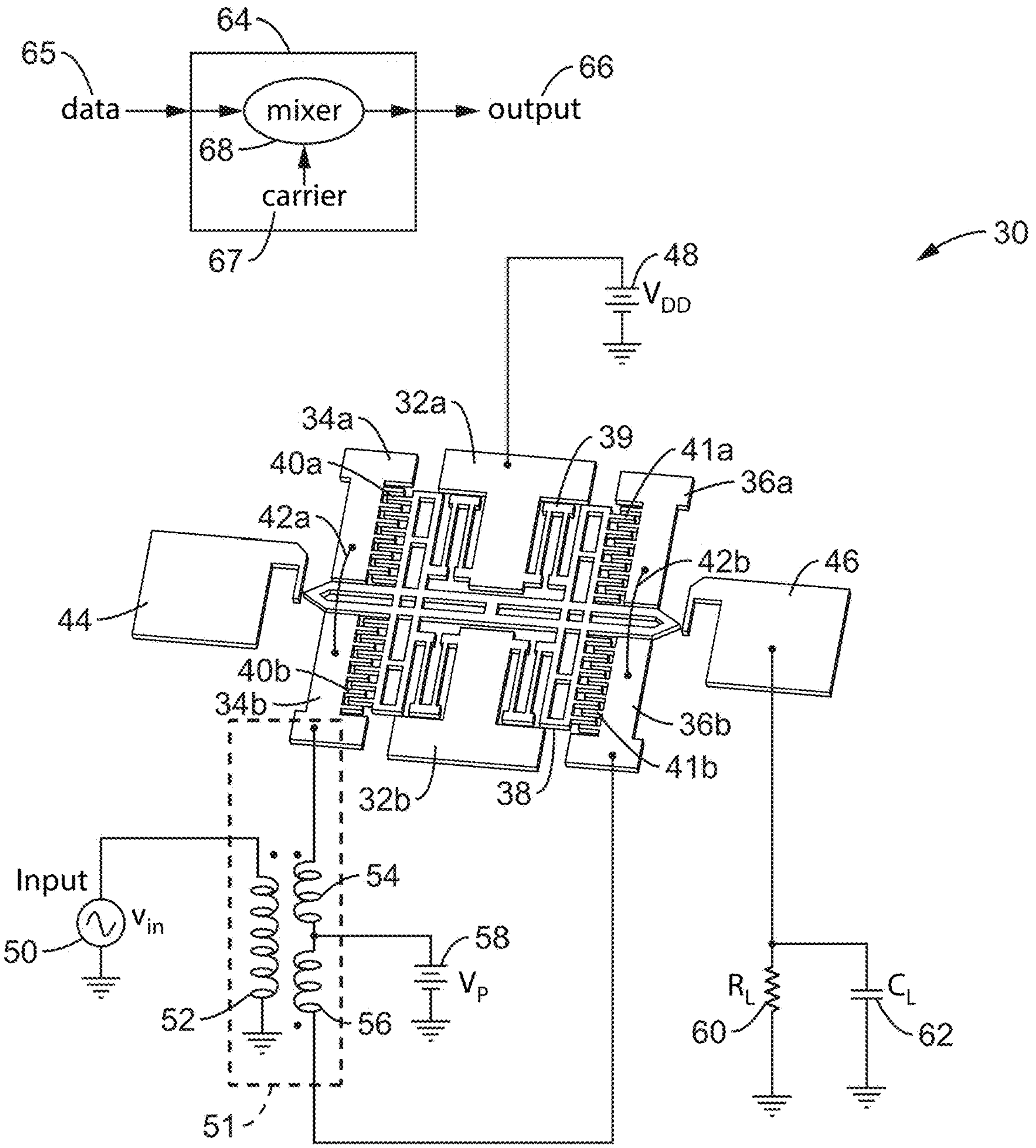
FIG. 2 is a pictorial view of a micromechanical resoswitch shown coupled to a measurement circuit, according to at least one embodiment of the present disclosure.

FIG. 1 and FIG. 2 illustrate an example embodiment 10, 30, of a resoswitch according to the present disclosure.

In FIG. 1 is seen one embodiment of a resoswitch 10 shown as a movable shuttle 14 (e.g., 1-μm-thick of gold) suspended (e.g., 2.5-μm) above the substrate 11 by folded-beam flexures 16 which connect between shuttle 14 and anchors 12 which are connected to, that is to say anchored to, substrate 11. In this example, flexures 16 are coupled to centralized anchor locations. Comb fingers 18 on opposite sides of the shuttle interdigitate with comb fingers from anchored electrodes to form classic comb-drive transducers capable of electrostatically driving the shuttle to amplitudes on the order of the finger lengths. It should be appreciated that the movable shuttle, suspending by beams, is a resonator which may be implemented in different ways without departing from the teachings of the present disclosure.

The shuttle also possesses impactor protrusions (contacts) 20 which are configured to impact bendable cantilevers rather than hard anchored electrodes. Thus, each impactor end 20 of shuttle 14 strikes the electrode with a soft blow, which reduces a "squegging" phenomenon that was evidenced in earlier resoswitches. It will be noted that squegging occurs when hard impacts cause a solid contact resoswitch to de-phase in a way that temporarily lowers the efficiency of the drive input, causing the device to lose amplitude and stop impacting until a return to proper phasing reinstates the drive and impacting recommences.

It should be appreciated that the resoswitch structure described above is shown by way of example and not limitation; as various arrangements of attaching a shuttle through flexures to anchors and using comb finger drive may be adopted without departing from the teachings of the present disclosure. In addition, resoswitches can take on various geometries, such as beams and the disks that operate at much higher frequencies.

The typical drive scheme employs the combination of a dc-bias ($V_P$-$V_{DD}$) and an ac signal input $v_i$ across the finger gaps that generates a force proportional to their product ($V_P$-$V_{DD}$) $v_i$ acting at the frequency of $v_i$.

In FIG. 2 the electrical connections are specifically depicted for operating the resoswitch as a communication receiver. A shuttle 38 is shown coupled through a set of flexures 39 (e.g., four flexures) to central anchor portions 32*a*, 32*b*, which are coupled to a voltage source, exemplified herein as a dc source, however, it should be appreciated throughout this application that an ac source, or other waveforms, may be utilized without departing from the teachings of the present disclosure. For example, the voltage may be an alternating waveform having a dc bias, or other waveforms depending on the application. Additional effector anchors 34*a*, 34*b*, and 36*a*, 36*b*, are shown on opposite sides of the shuttle in its direction of travel. These effector anchors receive the ac inputs. The interior of these effector anchors is configured with comb fingers 40*a*, 40*b*, 41*a*, 41*b*, that are designed to interdigitate with counterpart comb fingers extending from the shuttle.

The ac input voltage 50 (antenna receiving an exterior signal) enters through a transformer 51 comprising a primary side inductor 52, and a secondary comprising a bias tee of inductors 54, 56, superimposed on a center-tapped large dc voltage $V_P$ 58. One output of the transformer secondary is coupled to anchors 34*a*, 34*b*, having a first set of comb fingers 40*a*, 40*b* for driving the shuttle in a first direction, while the opposing output from the transformer secondary is connected to anchors 36*a*, 36*b*, having a second set of comb fingers 41*a*, 41*b* for driving the shuttle in an opposing (second) direction. It will be seen in this embodiment that anchor 34*a* is electrically connected 42*a* to anchor 34*b*, and similarly anchor 36*a* is electrically connected 42*b* to anchor 36*b*. In at least one embodiment connections 42*a* and 42*b* may not be present, in which case electrodes 34*a* and 36*a* can be used for other purposes, for example as capacitive transducers for motional current outputs.

The central anchor 32*a*, 32*b* is connected to a DC supply $V_{DD}$ 48, while a first cantilever electrode 46 is connected through parallel resistance 60 and capacitance 62 to ground. When the shuttle impactor contacts electrode 46 in response to which the output load capacitance $C_L$ 62 charges to $V_{DD}$ and registers an output high or '1'. The electrode in this embodiment is configured in any desired way to store charge and to allow draining off charge at a desired rate. In the figures this resistor-capacitor can be referred to as a charge storage element and could comprise discrete components; however, it may take any desired form without departing from the teachings of the present disclosure. For example, the layered structure of the electrode can provide a desired amount of capacitance, while the structure itself can provide a desired level of drain resistance. When receiving a space input, i.e., no sinusoid input received, the resoswitch does not impact, allowing the bleed resistor $R_L$ 60 to discharge the load to an output low, or '0'. As a result, the output bit stream matches the input modulating bit stream, meaning that the bits have been successfully communicated. The second electrode 44 is also an output electrode that might serve a separate following stage, for example a different digital block or gate. The availability of a second output has the advantage of being able to drive a larger fanout, since the first output electrode and second output electrode draw from the supply at different time intervals, so have all power available individually. Since impacts to the second output electrode occur approximately 180° phase-shifted from those at the first output electrode, there is a time signature difference that can be used to advantage later downstream, i.e., to delineate signals going down the different paths, perhaps for error detection and correction purposes. In addition, electrode 44 as shown here would provide a short voltage spikes each time the shuttle contacts it. However, in other embodiments this electrode could be configured with the same or different RC as is depicted for electrode 46, or it may also comprise just the capacitor, or any other conditioning circuitry to provide the desired output for the specific application.

When the ac input signal frequency matches the mechanical resonance frequency $f_o$ of the resoswitch, the alternating ac voltages on the opposing sets of comb fingers induce alternating directions of shuttle displacement. The shuttle displacement amplitude grows exponentially from rest until it is sufficient to induce periodic impactor-to-cantilever contact. This contact then charges the output electrode node 46 to $V_{DD}$, effectively closing the switch, an operation that fits nicely into an On-Off-Keying (OOK) signal reception role.

In this embodiment, the gated-sinusoid input waveform 50 realizes an Amplitude-Shift-Keying (ASK)-modulated resonance carrier that switches the resoswitch between low and high outputs that match the modulation, where each period of the modulation waveform contains an information bit; thus, generating bit outputs in response to envelope detection based on shuttle contact.

A transmitter block 64 is shown which receives a binary data stream 65. The data stream 65 and a carrier signal from carrier generator 67 is received at mixer (modulation circuit) 68 wherein the input data provides an envelope for the carrier. A modulated output 66 is directed for being received as input 50 of the resoswitch.

The transmitter can be implemented in a variety of ways without limitation, such as conventional transmission circuitry, and could be connected to any device supplying the data stream to be transmitted. The carrier oscillator 67 is configured for providing either a fixed frequency output to match the resonance frequency of the resoswitch, or a variable/selectable modulation frequency which can be tuned to the resonant frequency of the resoswitch and for FSK modulation can provide an off-resonant carrier for encoding the "0" periods.

The mixer may utilize any of a number of forms of modulation schemes, such as On-Off-Keying (OOK), Continuous Wave (CW), Amplitude-Shift-Keying (ASK), Frequency Shift Keying (FSK), or similar envelope generating modulation schemes. The mixer may also include any desired phase encoding (PE) technique, such as Manchester encoding, to limit the number of consecutive "0" bits received by the resoswitch.

The "1" bits being output are modulation envelopes carrying a carrier sinusoid at the resoswitch resonance frequency. The "0" bits may be formed as a period without a carrier, or with the carrier amplitude severely diminished, or with the carrier frequency being shifted outside of the resonant range for the resoswitch.

Figure 3:
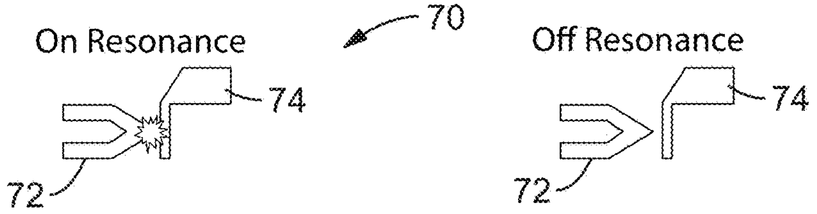
FIG. 3 is an enlarged view of the shuttle impactor contacting a conductive cantilever output electrode, according to at least one embodiment of the present disclosure.

FIG. 3 illustrates an example embodiment 70 of interactions between the shuttle impactor 72 and a cantilevered electrode 74. In the upper portion of the figure contact is shown being made in response to an input signal at a frequency matching the resonance frequency of the resoswitch, while the lower portion depicts the lack of contact when the input signal is not present or is off-resonance. It should be appreciated that the shape of the shuttle impactor and the cantilevered electrode is shown here by way of example and not limitation, as various arrangements may be adopted without departing from the teachings of the present disclosure.

Figure 4:
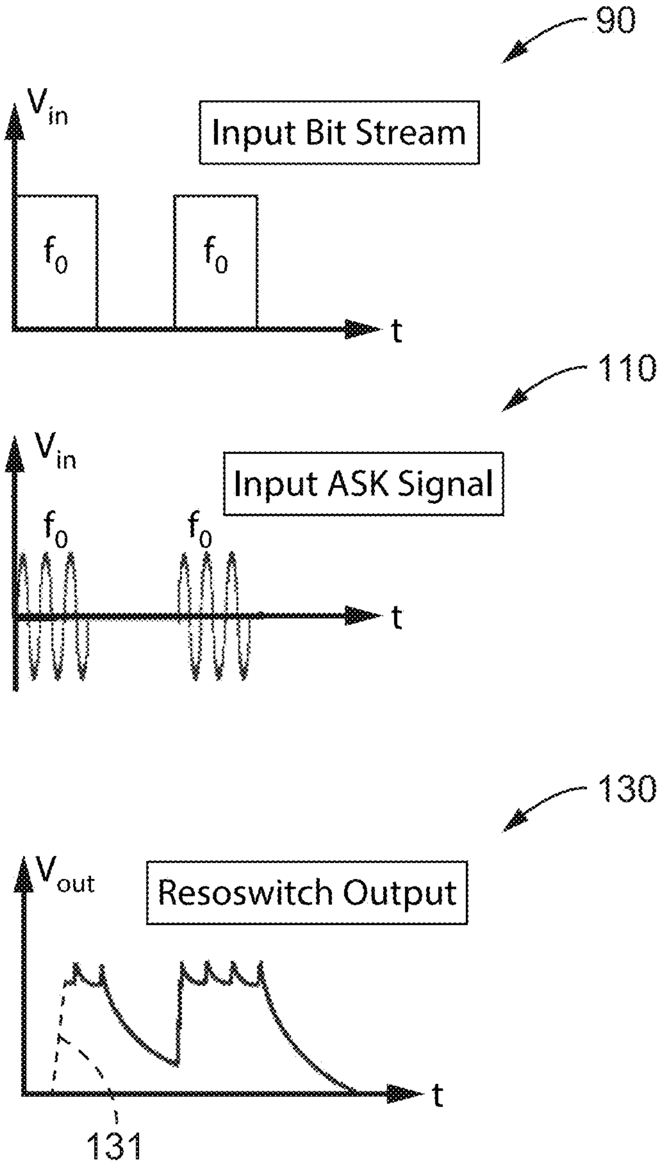
FIG. 4 are illustrations of voltage waveforms for the input bit stream, input ASK signal, and resoswitch output, according to at least one embodiment of the present disclosure.

FIG. 4 illustrates example waveforms 90 of the input bit stream and 110 the ASK-modulated resonance carrier with marks and spaces defined by the input bit stream 90. The resoswitch responds to mark periods, i.e., when the on-resonance sinusoid appears, by vibrating at resonance to impact its shuttle impactor against a conductive cantilever output electrode, connecting the cantilever to $V_{DD}$ and registering an output high or '1'. The resoswitch does not respond to space periods when there is no input power.

The upper plot 90 shows an input bit stream of an originating signal, for example used by a transmitter as a modulation envelope, that modulates a carrier sinusoid at the resoswitch resonance frequency to form the waveform to-be-received by the device in the middle graph 110. The output from the resoswitch configured according to the present disclosure is shown in the lower graph 130. It can be seen how the resoswitch output 130, once squared up with threshold detection, will match up with the original data being sent to the resoswitch. Dashed line 131 show a delay from '0' initial state to '1' transition.

3. Time to Impact and Maximum Bit Rate

As mentioned, the time required for the resoswitch to move from a rest state and increase its oscillation magnitude to the point of shuttle impactor contact depends strongly on Quality-factor "Q" and is proportional to the $Q/f_o$ ratio. Meanwhile, the minimum detectable input power, or sensitivity S, is inversely proportional to $f_o/Q$, presenting the opposite dependency. The tradeoff between sensitivity and switching time (which sets bit rate) is readily recognizable.

Table 1 and Table 2 at the end of the specification illustrate this tradeoff by comparing the predicted performance of a resoswitch with the design demonstrated in Section 2, but with assumed values of Q, one low (100) and one high (100,000). The Q=100 device posts a moderate sensitivity of −60.4 dBm (still adequate for short range communications) and a switching time (from a motionless starting state) of 1.23 ms. On the other hand, the Q=100,000 posts a much better sensitivity of −90.4 dBm, but a rather poor switching time (from a motionless starting state) of 1.23 s, and hence a poor bit rate.

The key to breaking this trade-off and achieving simultaneous high sensitivity and high bit rate capability lies in the energy storage ability of the high Q of the resoswitch. Specifically, by tapping into stored energy during non-driven periods, a resoswitch can be made to adapt to whatever bit rate appears at its input, where the faster the bit rate, the faster the reso-switching speed, so the more capable the switch is at supporting faster bit rates.

Figure 5:
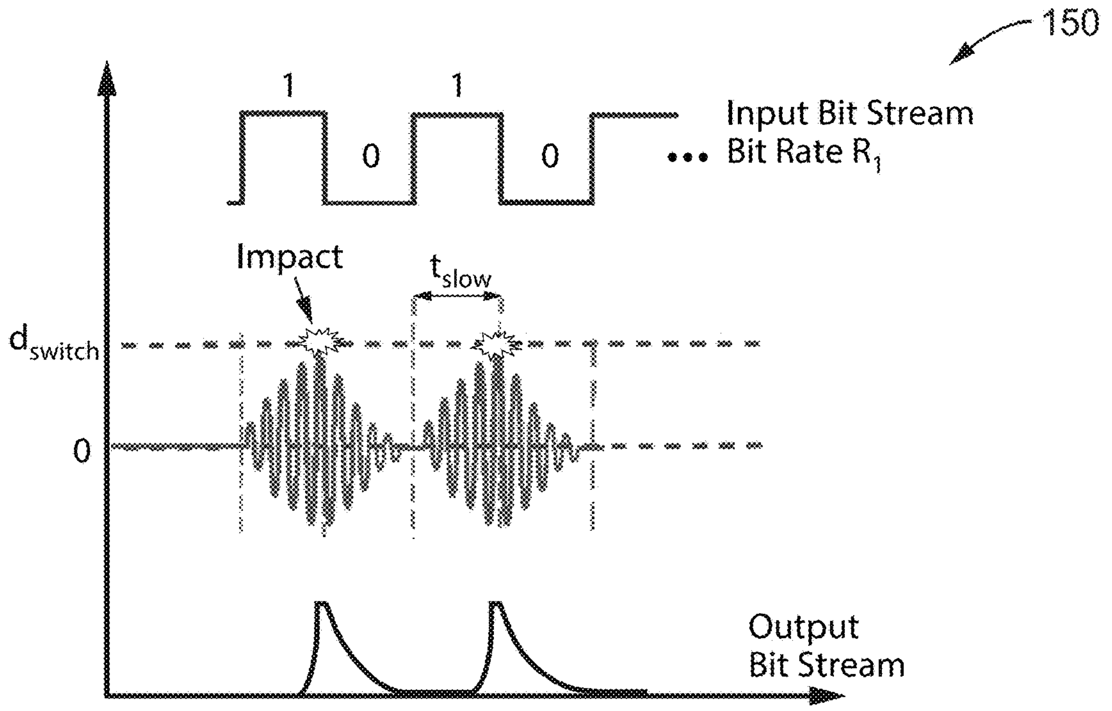
FIG. 5 and FIG. 6 are illustrations of resoswitch excitation, according to at least one embodiment of the present disclosure.
Figure 6:
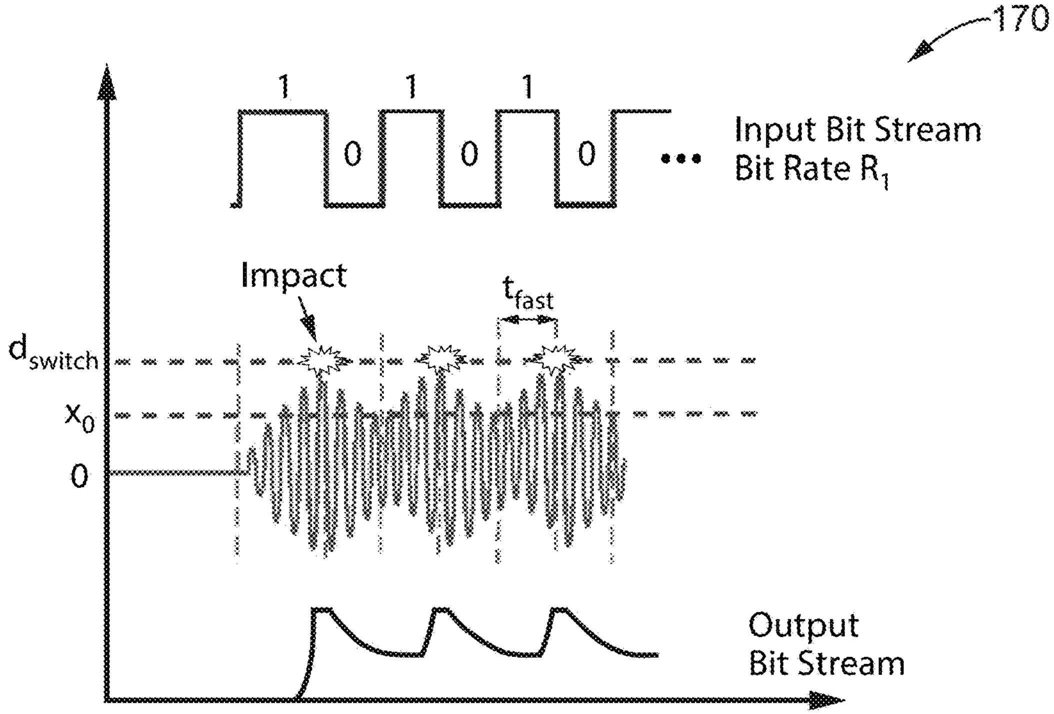

FIG. 5 and FIG. 6 provide example illustrations 150, 170 that describe conventional operation in comparison with the rate adaptability of the present disclosure. Each figure depicts mechanical displacement of the shuttle of the resoswitch as seen in the middle portion of the figure, in response to an input bit stream, where '1' bits are seen in the upper waveform as modulation envelopes for containing a carrier sinusoid (not shown) at the resoswitch resonance frequency, and an output voltage waveform is seen in the lower portion of each figure. During the "0" bits there is no carrier sinusoid being received.

In FIG. 5 is shown an example of conventional resoswitch operation receiving the most rapid input bit rate of which it is capable. In response to receiving the "1" input (upper waveform), the displacement of the resoswitch (middle waveform) increases until it reaches the switch displacement threshold, $d_{switch}$. Then the input changes to a "0", and resoswitch displacement decreases back until it reaches zero displacement, reaching complete rest between mark bits, thereby forcing a long resoswitch mechanical switch time-to-impact. So, it is seen that resoswitch vibration amplitude of the shuttle requires time to build under continuous applied input power until it impacts the output electrode. This long switch time is not problematic when the bit rate is low. The lower waveform shows the voltage output from the output electrode.

In a typical switching electronic system, when increasing the bit rate of an input bit stream, one would need to be careful to ensure that sufficient time is provided between bits, so the voltage could rise to a '1' or fall to a '0' within the allotted time. These rise and fall times are governed by the time constants associated with the system's electronic circuit. It is with this perspective that a digital designer would not be motivated to consider trying to increase input bit rate beyond what is seen in FIG. 5, toward obtaining a higher bit rate, since doing so would overwhelm the time constants of the electronic system.

In FIG. 6 the operation of the present disclosure is exemplified, which takes into account the interoperability between the mechanical and electrical nature of the resoswitch, and the manner in which modulation is performed and/or the resoswitch is configured. It will be appreciated that the resoswitch is a combined mechanical and electrical device, which relies on both mechanical rise and fall time constants, as well as electrical ones, the former are typically of significantly longer duration than the latter. Thus, the electrical, i.e., voltage, output (lower waveform) of the resoswitch can fall to a '0' much faster than the mechanical vibrations of the resonating resoswitch element will come to a stop. Thus, upon receiving a '0' input the resoswitch continues vibrating (while not impacting) even after the electrical output voltage has reached an output low.

Accordingly, the methodology of the present disclosure both allows and encourages the resoswitch to continue vibrating (but not impact) during a '0' output period, so that as a following '1' is being received, the required displacement amplitude increase to reach $d_{switch}$ is significant smaller than the initial static impactor-to-electrode gap.

In FIG. 6 it is shown how a continually vibrating, but the in-motion but non-impacting, resoswitch need only increase in amplitude by a displacement amount ($d_{switch}-x_o$), which is much smaller than displacement $d_{switch}$, and thus requires significantly less time. In this figure the same resoswitch device is utilized as seen in FIG. 5, yet here it is shown being excited by a fast bit rate-modulated input having a much shorter bit period, the resoswitch is still vibrating by the (short) time the next mark input arrives.

This method of operating the resoswitch makes use of stored energy, in view of it being pre-energized with an initial condition, that allows it to reach the impact threshold in less time. It should be appreciated that the first '1' bit seen in FIG. 6 is longer than the subsequent bits in the bit stream. During this time period energy is input to the device for storage. It should also be noted that the difference in the lengths of the '1' bits can be significantly larger than what is depicted in the waveforms. The generation of this longer first bit (or pre-energization bit) is important, since the ability to increase communication bit rate according to the present disclosure is aided by this pre-energization which operates in combination with the use of short '0' bits.

The expression for time to impact (or switch time) shown in Table 2 (tables are seen at the end of the specification) as Eq. (4) now depends strongly on the starting displacement amplitude $x_0$, which in turn depends on the input period. As the input period shrinks, for example the intended bit rate rises, the resoswitch adapts to the new bit rate by reducing its own switching time. The adaptation is such that Eq. (4) in Table 2 predicts that resoswitch response time ultimately does not limit the achievable bit rate, but rather the resonance frequency or the RC time constant associated with charging the output load provides the bounds on response time. Specifically, both the Q=100 and Q=100,000 cases in Table 1 should be able to support bit rates all the way up to the device's 23.7 kHz resonance frequency—in this case 47.4 kbps. In certain instances, it may be possible to support bit rates which are beyond the device's resonance frequency.

4. Experimental Results

Figure 7:
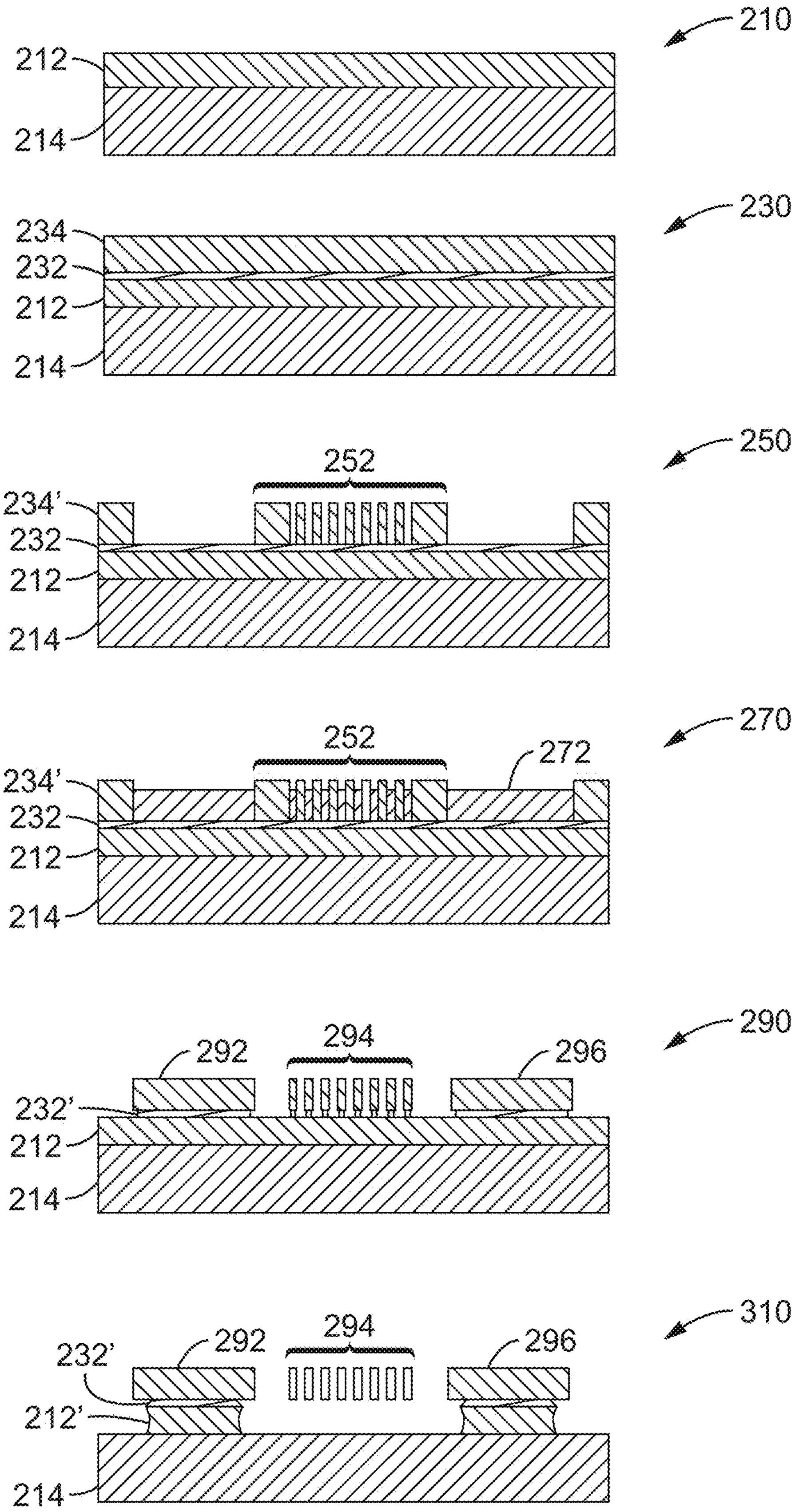
FIG. 7 are cross-section views of a one-mask resoswitch fabrication process, according to at least one embodiment of the present disclosure.

FIG. 7 illustrates example embodiment steps 210, 230, 250, 270, 290 and 310 for fabricating resoswitches using a one-mask gold electroplating process with cross sections of major process steps to yield the device shown in FIG. 1.

The process commences 210 with CVD deposition of sacrificial oxide 212 onto a silicon wafer 214, then in 230 with sputter deposition of Cr/Au 232 to promote adhesion and serve as an electroplating seed layer, followed by deposition of photoresist 234. Photoresist patterning 250 modifies the photoresist material, now seen as photoresist material 234' with mold 252. In step 270 gold electroplating 272 is performed including through the mold 252, such as in a cyanide-based solution. Removal of the photoresist mold yields structure 290 having anchors 292, 296 on adhesion layer 232', with shuttle elements 294 which are still attached to the sacrificial oxide. In 310 the sacrificial oxide is exposed to vapor-phase HF to yield 212' the final free-standing movable shuttle elements and fixed anchors.

The process differs from previous resoswitch processing in its use of photoresist rather than oxide as an electroplating mold, which accommodates thinner (1-μm rather than 2-μm thick) devices, but still with a submicron impactor-to-cantilever electrode gap spacing. It should also be appreciated that the disclosed device fabrication steps are given by way of example and not limitation; as these steps can be varied in creating a resoswitch which operates according to the present disclosure.

Figure 8:
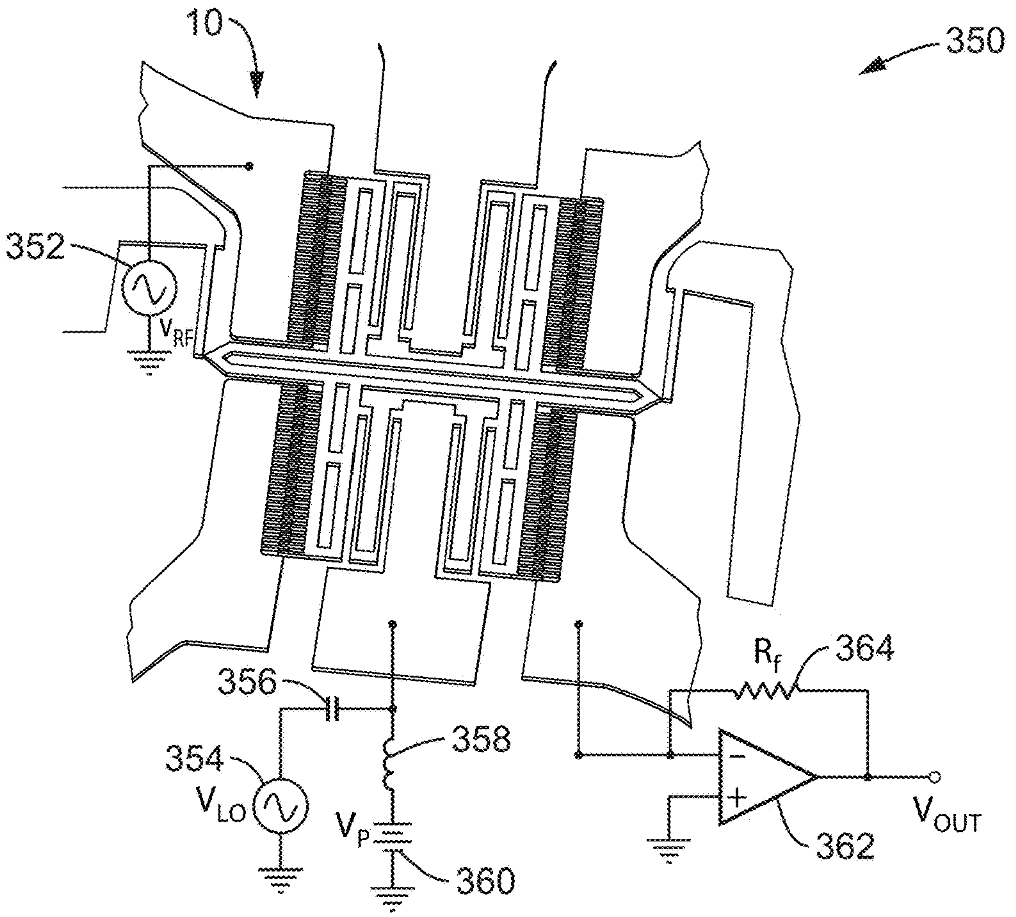
FIG. 8 is a schematic of a mixing measurement setup detailing applied bias and local oscillator voltages to null parasitic feedthrough when measuring transmission spectrum, as utilized according to at least one embodiment of the present disclosure.
Figure 9:
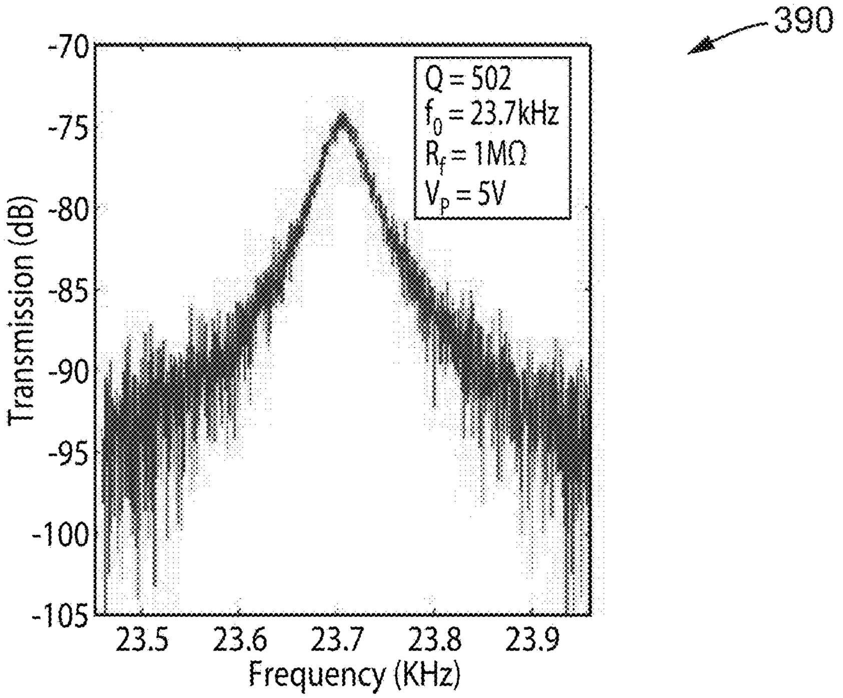
FIG. 9 is a plot of transmission spectrum of the resoswitch as set up in FIG. 8, as measured for an embodiment of the present disclosure.

FIG. 8 and FIG. 9 illustrate an example test setup 350 to measure the frequency spectrum of the resonant structure of the resoswitch and frequency spectrum test results 390 from testing.

In FIG. 8 is shown a resoswitch 10 connected to a circuit that employs a mixing method to eliminate unwanted parasitic feedthrough current that might otherwise mask the motional current. In this mixing method $V_{rt}$ and $V_{lo}$ are mixed into a force at the resonance frequency of the device. This creates feedthrough currents at $w_{rt}$ and $w_{lo}$, but not at the resonance frequency of the device, thereby suppressing interference from parasitic feedthrough current. It should be noted that this depicted configuration is mainly utilized in this disclosure for device characterization. During this characterization, the output electrode cantilever may even be removed to allow free non-impacting motion of the resonant shuttle during this measurement to determine the frequency response of the device. It should also be appreciated that other embodiments of the mixing method can be utilized for delivering information bits to the resoswitch.

The resoswitch is connected as follows. A first side anchor is coupled to an RF source signal $V_{RF}$ 352, and the central anchor is coupled to a source $V_{LO}$ 354 through a capacitance 356. This central anchor is also coupled to a dc source (e.g., 5 Volts) $V_P$ 360 through inductor 358. The capacitor and inductor are normally supplied via a bias tee.

The second side anchor is coupled for sensing voltage, such as through amplifier 362 with gain set by feedback resistance 364 to generate a measured output as $V_{OUT}$. The resoswitch tested in this example lacked the cantilevered impact electrodes to allow for larger vibration amplitudes that increase the output current, making their measurement easier.

A vacuum probe station, (e.g., Lakeshore® FWPX) housed the resoswitch die during testing, providing a sufficient (e.g., 800-μTorr) vacuum and feedthrough connections to the external measurement instruments.

In FIG. 9 is shown measured frequency spectrum from the test setup of FIG. 8, and it is seen that this example has a resonance frequency $f_0$ of 23.7 KHz and a Quality-factor "Q" of 502 (expected for gold), respectively.

Figure 10:
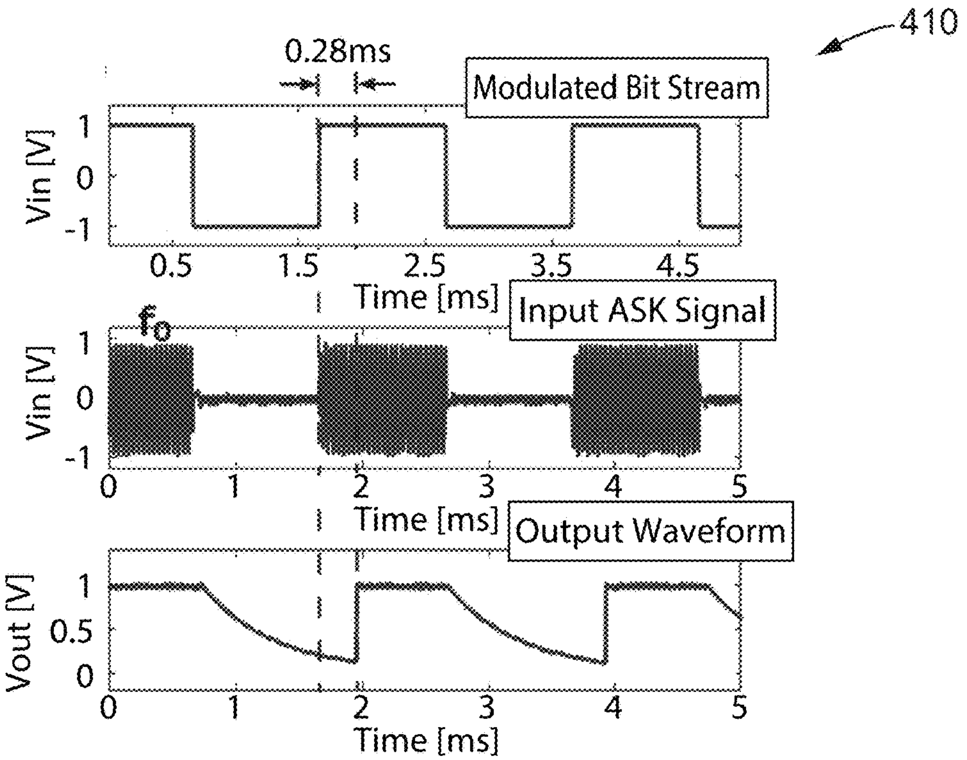
FIG. 10 through FIG. 12 are measured waveforms showing modulated bit stream, input ASK signal, and output waveform in response to different bit periods, as measured for an embodiment of the present disclosure.
Figure 11:
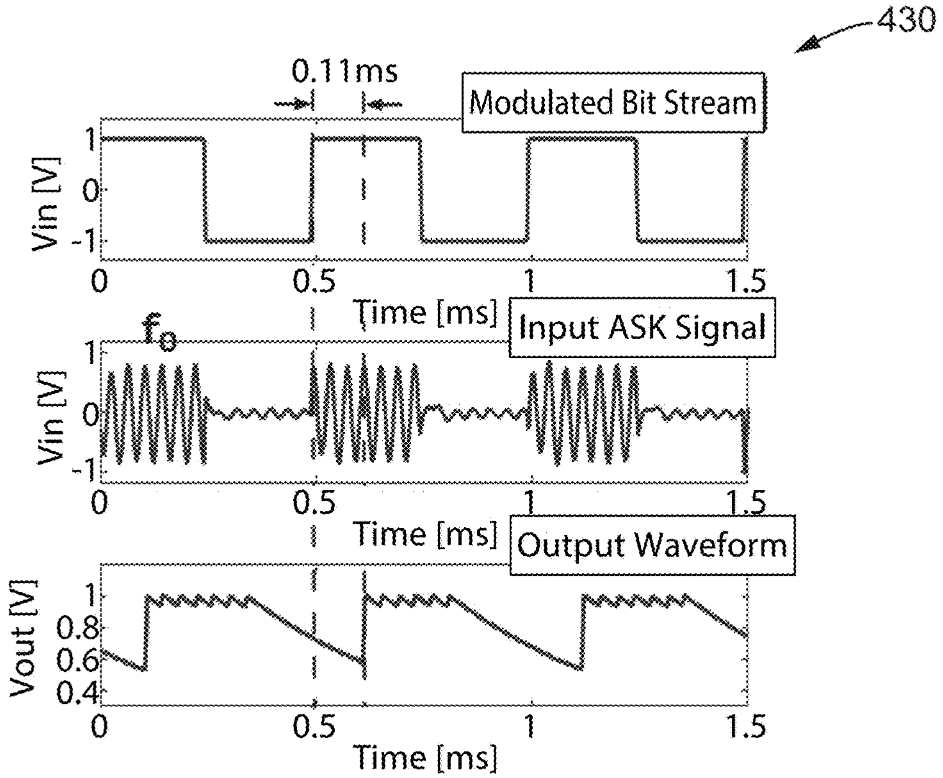
Figure 12:
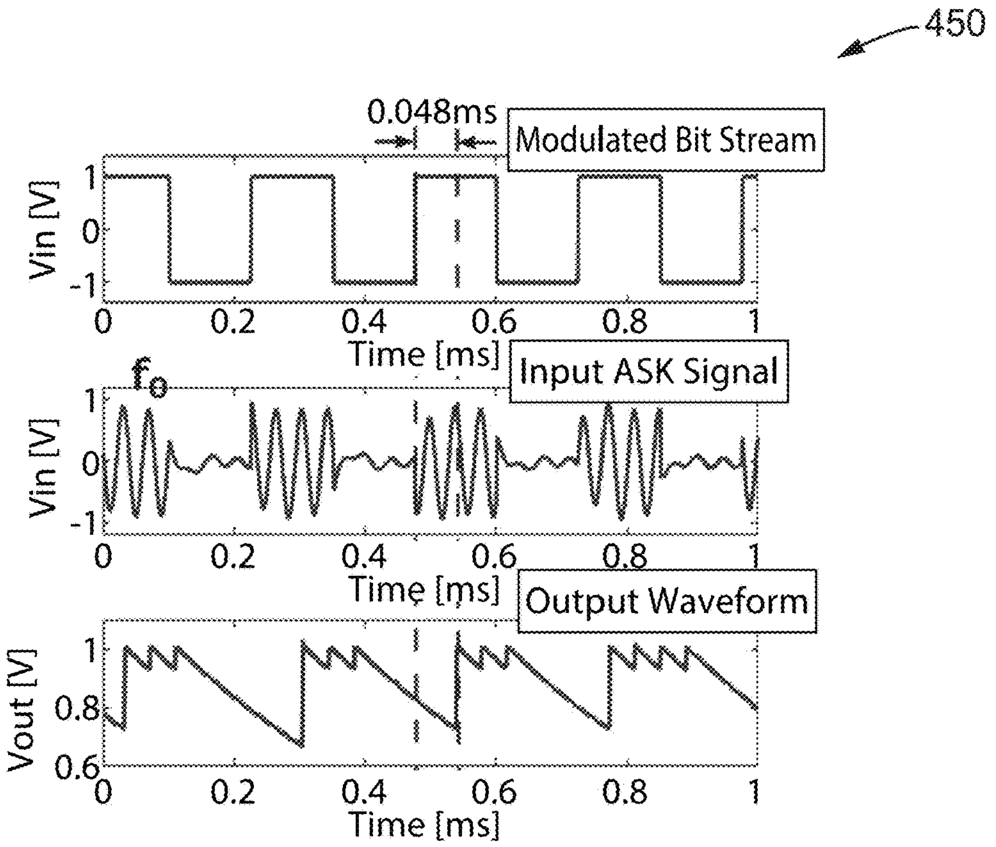

FIG. 10 through FIG. 12 illustrates example results 410, 430 and 450 of measured oscilloscope waveforms of a resoswitch excited by a 50% duty cycle ASK-modulated input with three different input bit rates. Measurements are shown in the figures at different modulation bit stream frequencies, FIG. 10 at 1-kbps, FIG. 11 at 4 kbps, and FIG. 12 at 8 kbps. For these tests a Tektronix AFG3102 Arbitrary Function Generator modulated a resonance carrier into Amplitude-Shift-Keyed (ASK) signal as a modulated bit stream (top plot of each graph), for gating sinusoidal waveforms to provide inputs (input ASK signal—middle plot of each graph) for resoswitch performance evaluation, whose output waveforms are shown on the bottom plot of each graph.

It should be appreciated that in progressing from FIG. 10 through FIG. 12, the resoswitches time to impact decreases as the bit rate increases, allowing the resoswitch to keep up with the bit rate, essentially adapting to each bit rate by retaining more energy as the bit period shrinks.

Figure 13:
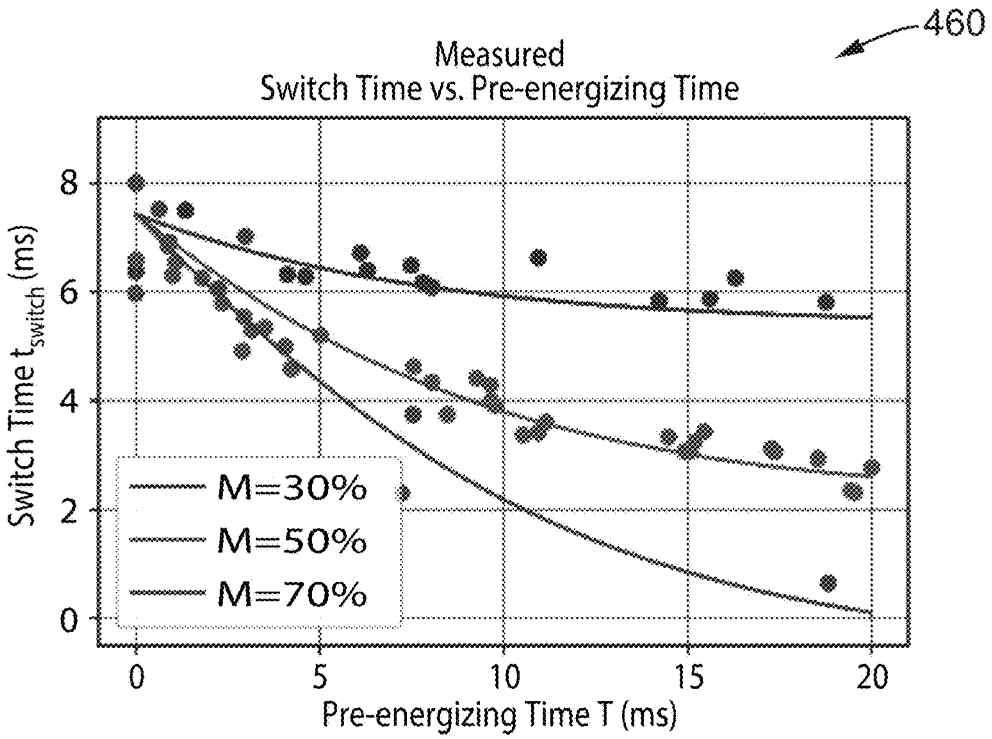
FIG. 13 is a graph of measured switching time in response to pre-energizing time at different modulation factors, as measured for an embodiment of the present disclosure.
Figure 14:
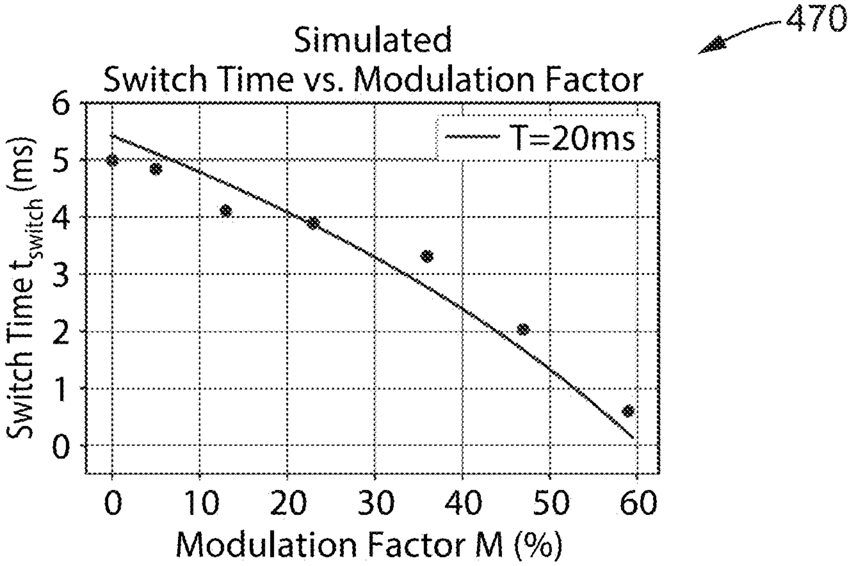
FIG. 14 is a plot of switching time with respect to modulation factor, as measured for an embodiment of the present disclosure.

FIG. 13 and FIG. 14 illustrate example results 460, 470 in a structured evaluation of switching performance. The starting displacement amplitude is given by:

$$\frac{x_0}{x_{max}} = \frac{v_M}{v_i}\left(1 - \exp\left(-\frac{\omega_0}{2Q}T\right)\right) = M\left(1 - \exp\left(-\frac{\omega_0}{2Q}T\right)\right)$$

Figure 15:
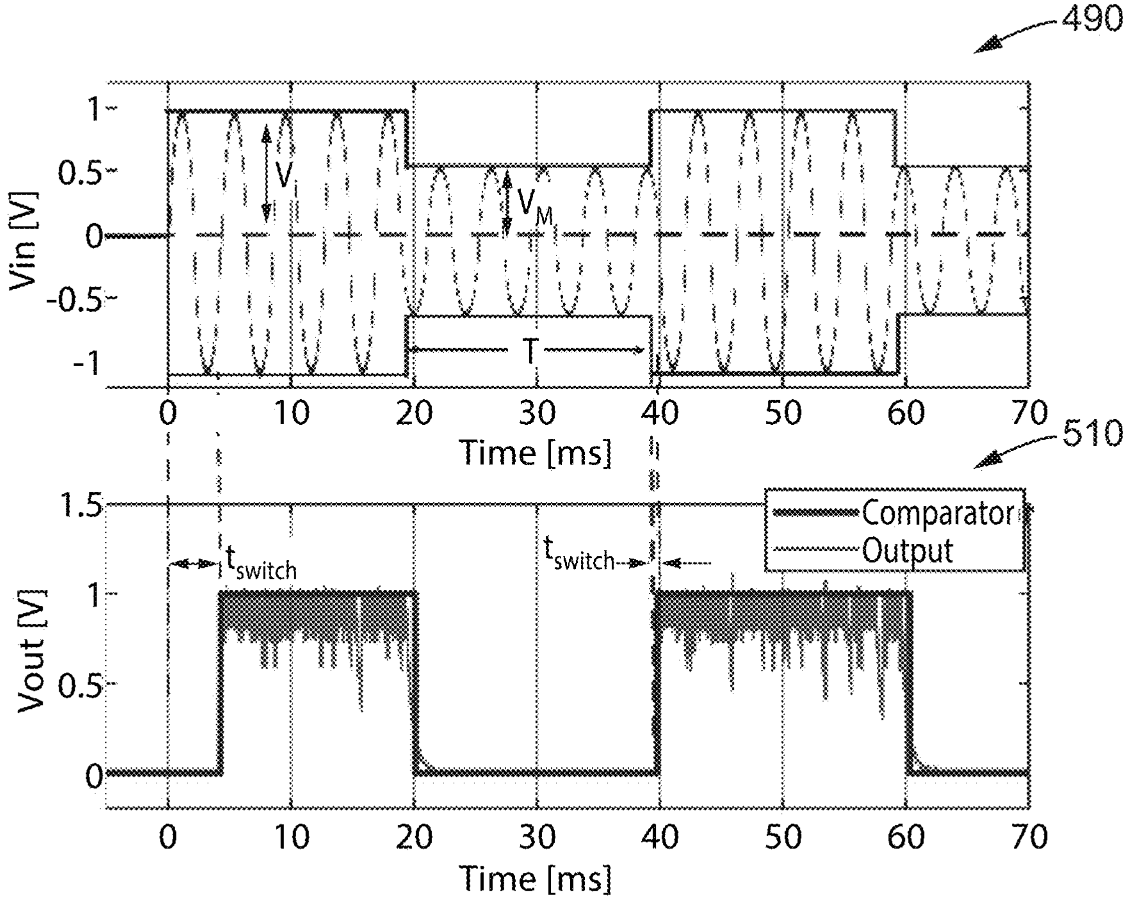
FIG. 15 is a plot of switching times comparing waveforms both with and without pre-energization, as measured for an embodiment of the present disclosure.

These plots of the measured switching time $t_{switch}$ (depicted as dots in the graph) of two devices with varied starting displacement amplitude $x_0$ alongside model-predicted curves (depicted as lines) using measured values of $f_0$ and Q, and calculated $x_0$ and $d_{switch}/x_{max}$. In this example the starting displacement amplitude $x_0$ is controlled by varying pre-energizing time T, such as seen in FIG. 15, and/or pre-energizing modulation factor M. In each case, switching time decreases with increasing pre-energization, and in some cases down to 48 microseconds. As can be seen in how closely the measurements (dots) fit the theory (curves), a highly correlated match exists between theory and practical results.

In FIG. 13 is seen plots of switching time with respect to the amount of pre-energizing time T, such as for FIG. 15, at different modulation factors. The curves depict the models, while the dots represent measurements. The three curves show modulation factors M of 30%, 50% and 70%. It is readily seen that switching time decreases with higher pre-energizing amplitudes and longer pre-energizing times.

In FIG. 14 is seen switching time with respect to modulation factor (See VM in FIG. 15) for a 50% duty-cycle square wave input with T=20 ms. Increasing the modulation factor decreases the switching time, since it increases the initial displacement amplitude upon an input rise.

FIG. 15 illustrates example results of switching time shown with pre-energization 490 and without pre-energization 510. The output shown in the lower portion of the figure, is the raw output across output capacitor $C_L$ 62 in FIG. 2. This signal is then received by comparator or similar circuit (flip-flop, or inverter, and so forth), which turns the output into a clean output waveform. The first bit (left side of plot) with amplitude $V_i$ has no pre-energization and shows a long switch time. Between the first and second bit (toward center of the plot) is a pre-energizing period where the input amplitude is reduced to $V_M$ for time T. The switch time for the second bit (right side of the plot) is subsequently faster.

5. Conclusion

The demonstrations indicate that resoswitch receivers can in fact achieve reasonable bit rate communications despite their high Q; whereby the potential breadth of applications for resoswitches expands beyond mere label updates or timing synchronization to include higher data rate applications, such as wireless audio reception and transcontinental firmware updates from a central location, perhaps using the same 60-kHz WWVB channels as used for transcontinental radio-set clocks. Because pre-energization removes switching time as a constraint on bit rate, it leaves mainly resonance frequency as a remaining limitation. Whereby future work directed toward reaching even higher bit rates should focus on raising the resonance frequency of resoswitches while retaining sensitivity.

6. General Scope of the Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A bit rate adaptive resonant switch (resoswitch) communication system, comprising: (a) a microelectromechanical system (MEMS) resonant switch (resoswitch) operating as a receiver; (b) a resonator of said resoswitch which is configured for oscillating between a first and second position, said resoswitch is conductive and connected to a voltage source, and configured for impacting against a conductive output electrode when the resonator reaches a threshold displacement, whereby charge is transferred from the resonator to the output electrode which creates a resoswitch output signal; (c) wherein said conductive output electrode is configured for storing a desired level of charge, wherein each time said resonator makes contact with the output electrode, charge is transferred through the resonator and is stored in the conductive output electrode, and whereas when contact is not being made between the resonator and output electrode, then charges are being drained from said conductive output electrode to selectively ramp down the voltage level on said output electrode; (d) a transmitter circuit configured for receiving a binary data stream and then wirelessly transmitting said binary data stream to said resoswitch; (e) a carrier oscillator of said transmitter circuit is configured for generating a carrier frequency which matches the mechanical resonance frequency of the resoswitch; (f) a mixer of said transmitter circuit that is configured for using the binary data stream for modulating the carrier and generating a mixed signal with marks and spaces which is transmitted to the resoswitch; (g) wherein said resoswitch and said transmitter circuit are configured for interoperating in said system to harness stored mechanical resonance energy of the resoswitch to reduce its required switching energy, and to adapt to higher bit rates of the transmitter circuit by using an increased Quality (Q) factor of the resoswitch to extend the duration of resonator oscillation to span the length of any '0' level input, so that sufficient stored mechanical resonance energy is still present in said oscillating resonator when the next '1' level input is received, whereby resonator oscillation more rapidly reaches a displacement amplitude in which said resonator then makes contact with the output electrode; (h) wherein said transmitter circuit and said resoswitch can operate at higher bit rates because each transmission does not incur delays in ramping up resonator oscillation displacement from a static condition when receiving a '1' input, and awaiting after a '0' input for the shuttle to return to a static displacement state; and (i) wherein marks and spaces which have been wirelessly transmitted to the resoswitch are output from the resoswitch as a resoswitch output signal.

A bit rate adaptive resonant switch (resoswitch) communication system, comprising: (a) a microelectromechanical system (MEMS) resonant switch (resoswitch) operating as a receiver; (b) a resonator of said resoswitch which is configured for oscillating between a first and second position, said resoswitch is conductive and connected to a voltage source, and configured for impacting against a conductive output electrode when said resonator reaches a threshold displacement, whereby charge is transferred from the resonator to the output electrode; (c) wherein said conductive output electrode is configured for storing a desired level of charge, wherein each instance that said resonator makes contact with the output electrode, charge is transferred through the resonator and is stored in the charge storage circuit, and whereas when contact is not being made between said resonator and output electrode, then charges are being drained from said conductive output electrode to selectively ramp down the voltage level on said output electrode; (d) a transmitter circuit configured for wirelessly transmitting a received binary data stream to said resoswitch; (e) wherein said transmitter circuit is configured for receiving phase encoded (PE) data, or converting its input data to provide a PE data stream which limits the number of consecutive "0" bits to be received by said resoswitch; (f) a carrier oscillator of said transmitter circuit is configured for generating a carrier frequency which matches the mechanical resonance frequency of said resoswitch; (g) a mixer of said transmitter circuit that is configured for using the PE data stream as a modulation envelope for the carrier frequency and generating a mixed signal with marks and spaces which is transmitted to said resoswitch; (h) wherein said transmitter circuit is configured for generating an extended length first '1' input at the start of receiving a new binary data stream to be communicated to said resoswitch; (i) wherein said resoswitch and said transmitter circuit are configured for interoperating in said system to harness stored mechanical resonance energy of said resoswitch to reduce its required switching energy, and to adapt to higher bit rates of the transmitter circuit by using an increased Quality (Q) factor of said resoswitch to extend the duration of resonator oscillation to span the length of any '0' level input, so that sufficient stored mechanical resonance energy is still present in said oscillating resonator when the next '1' level input is received, whereby resonator oscillation more rapidly reaches a displacement amplitude in which said resonator then makes contact with said output electrode; and (j) wherein said transmitter circuit and said resoswitch can operate at higher bit rates because each transmission does not incur delays in ramping up resonator oscillation displacement from a static condition when receiving a '1' input and awaiting after a '0' input for the resonator to return to a static displacement state.

A micromechanical resoswitch, comprising: (a) a substrate; (b) a plurality of folded-beam flexures; (c) a moveable shuttle suspended above the substate by the plurality of folded-beam flexures; (d) a plurality of comb fingers on opposite sides of the shuttle that interdigitate with comb fingers from anchored electrodes to form comb-drive transducers configured to electrostatically drive the shuttle to amplitudes on the order of the finger lengths.

The apparatus or method or system of any preceding implementation, wherein said transmitter circuit is configured for generating an extended length first '1' input at the start of receiving a new binary data stream to be communicated to said resoswitch.

The apparatus or method or system of any preceding implementation, wherein said binary data stream comprises a phase encoded (PE) data stream, or said mixer performs converting said binary data stream into a PE data stream which limits the number of consecutive "0" bits to be received by said resoswitch; and wherein said mixer of said transmitter circuit is configured for using the PE data stream as a modulation envelope for the carrier frequency and generating a mixed signal which is transmitted to said resoswitch.

The apparatus or method or system of any preceding implementation, wherein said resoswitch is configured to respond to mark periods during which sinusoidal resonance of said resonator is being accentuated as mechanical displacements of said resonator during resonance reach the displacement threshold and said resonator begins impacting said output electrode.

The apparatus or method or system of any preceding implementation, wherein when receiving a space input, there is insufficient energy for driving the resonance of said resonator, and the mechanical displacements of the resonator during its resonance are diminishing.

The apparatus or method or system of any preceding implementation, wherein said mixed signal which is transmitted to said resoswitch in a radio-frequency range from the low kHz range.

The apparatus or method or system of any preceding implementation, wherein marks and spaces are transmitted by modulating a carrier signal.

The apparatus or method or system of any preceding implementation, wherein said resonator of said resoswitch is configured for only oscillating at its mechanical resonance frequency, wherein receiving a wireless signal which is not sufficiently close to the mechanical resonance frequency of said resoswitch will not induce resonator mechanical displacements to reach the displacement amplitude in which said resonator makes contact with said output electrode.

The apparatus or method or system of any preceding implementation, wherein resonator within the resoswitch is configured for storing mechanical resonance energy.

The apparatus or method or system of any preceding implementation, wherein said resonator comprises a shuttle suspending by flexible beams connecting it to a body portion of said resoswitch.

The apparatus or method or system of any preceding implementation, (a) wherein said resoswitch having an input configured to accept an ASK-modulated resonance carrier with marks and spaces.

The apparatus or method or system of any preceding implementation, wherein the resoswitch is configured to respond to mark periods, such as when the resonance sinusoid appears, by vibrating at resonance to impact a shuttle impactor against a conductive cantilever output electrode, connecting the cantilever to $V_{DD}$, and charging output load capacitance to $V_{DD}$ and registering an output high or '1'.

The apparatus or method or system of any preceding implementation, wherein when receiving a space input (no sinusoid) the resoswitch does not move, thereby allowing a bleed resistor to discharge the load to an output low, or '0'.

The apparatus or method or system of any preceding implementation, wherein ultimately the output bit stream matches the input modulating bit stream, indicating that the bits have been successfully communicated.

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to +35°, such as less than or equal to ±5°, less than or equal to ±4°, less than or equal to ±3°, less than or equal to ±2°, less than or equal to ±1°, less than or equal to ±0.5°, less than or equal to ±0 0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

ture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art. All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Predicted and Measured Pre-Energized Resoswitch Performance

| | | | | Not Pre-Energized | | Pre-Energized | |
|---|---|---|---|---|---|---|---|
| | Quality Factor, Q | Input Bit Rate, $R_i$ (bps) | Sensitivity, S (dBm) | Switch Time, $t_{switch}$ (ms) | Bit Rate, $R_b$ (bps) | Switch Time, $t_{switch}$ (ms) | Bit Rate, $R_b$ (bps) |
| Section III Examples | 100 | Supported Bit Rate | −60.4 | 1.23 | 813 | 0.0167 | 71600 |
| | 100000 | Supported Bit Rate | −90.4 | 1230 | 0.82 | 16.7 | 72 |
| Measured Device | 502 | 1000 | −67.4 | 1.58 | 632 | 0.28 | 1000 |
| | 502 | 4000 | −67.4 | 1.58 | 632 | 0.11 | 4000 |
| | 502 | 8000 | −67.4 | 1.58 | 632 | 0.048 | 8000 |

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfei- Device Parameters: Thickness, h=1 mm, Folded-Beam Length, $L_b$=60 mm, Folded-Beam Width, $W_b$=1.5 mm, Total Shuttle Area, $A_s$=5900 $mm^2$, Finger Gap, $d_f$=1 mm, No. Fingers per Side=38, Suspension Stiffness, $k_r$=2.47 N/m, Impactor-to-Cantilever Gap, $d_{switch}$=500 nm.

TABLE 2

Modeling Equations

| | | |
|---|---|---|
| Maximum Displacement, $x_{max}$ | $x_{max} = d_{switch}k_r/Q\eta v_i$ | (1) |
| Electromechanical Coupling Factor, η | $\eta = 2NV_P\epsilon h/d_f$ | (2) |
| Starting Displacement Amplitude $x_0$ ($R_i$: Input Signal Bit rate) | $x_0 = \frac{d_{switch}k_r}{Q\eta v_i}\exp\left(-\frac{\omega_0}{4QR_i}\right)$ | (3) |
| Switch Time, $t_{switch}$ | $t_{switch} = -\frac{2Q}{\omega_0}\ln\left(\frac{1-\frac{d_{switch}k_r}{Q\eta v_i}}{1-\frac{x_0k_r}{Q\eta v_i}}\right)$ | (4) |
| Sensitivity, S | $S = d_{switch}^2k_r\omega_0/Q$ | (5) |

What is claimed is:

1. A bit rate adaptive resonant switch (resoswitch) communication system, comprising:

a microelectromechanical system (MEMS) resonant switch (resoswitch) operating as a receiver;

a resonator of said resoswitch which is configured for oscillating between a first and second position, said resoswitch is conductive and connected to a voltage source, and configured for impacting against a conductive output electrode when the resonator reaches a threshold displacement, whereby charge is transferred from the resonator to the output electrode which creates a resoswitch output signal;

wherein said conductive output electrode is configured for storing a desired level of charge, wherein each time said resonator makes contact with the output electrode, charge is transferred through the resonator and is stored in the conductive output electrode, and whereas when contact is not being made between the resonator and output electrode, then charges are being drained from said conductive output electrode to selectively ramp down the voltage level on said output electrode;

a transmitter circuit configured for receiving a binary data stream and then wirelessly transmitting said binary data stream to said resoswitch;

a carrier oscillator of said transmitter circuit is configured for generating a carrier frequency which matches the mechanical resonance frequency of the resoswitch;

a mixer of said transmitter circuit that is configured for using the binary data stream for modulating the carrier and generating a mixed signal with marks and spaces which is transmitted to the resoswitch;

wherein said resoswitch and said transmitter circuit are configured for interoperating in said system to harness stored mechanical resonance energy of the resoswitch to reduce its required switching energy, and to adapt to higher bit rates of the transmitter circuit by using an increased Quality (Q) factor of the resoswitch to extend the duration of resonator oscillation to span the length of any '0' level input, so that sufficient stored mechanical resonance energy is still present in said oscillating resonator when the next '1' level input is received, whereby resonator oscillation more rapidly reaches a displacement amplitude in which said resonator then makes contact with the output electrode;

wherein said transmitter circuit and said resoswitch can operate at higher bit rates because each transmission does not incur delays in ramping up resonator oscillation displacement from a static condition when receiving a '1' input, and awaiting after a '0' input for the shuttle to return to a static displacement state; and wherein marks and spaces which have been wirelessly transmitted to the resoswitch are output from the resoswitch as a resoswitch output signal.

2. The communication system of claim 1, wherein said transmitter circuit is configured for generating an extended length first '1' input at the start of receiving a new binary data stream to be communicated to said resoswitch.

3. The communication system of claim 1, wherein said binary data stream comprises a phase encoded (PE) data stream, or said mixer performs converting said binary data stream into a PE data stream which limits the number of consecutive "0" bits to be received by said resoswitch; and wherein said mixer of said transmitter circuit is configured for using the PE data stream as a modulation envelope for the carrier frequency and generating a mixed signal which is transmitted to said resoswitch.

4. The communication system of claim 1, wherein said resoswitch is configured to respond to mark periods during which sinusoidal resonance of said resonator is being accentuated as mechanical displacements of said resonator during resonance reach the displacement threshold and said resonator begins impacting said output electrode.

5. The communication system of claim 1, wherein when receiving a space input, there is insufficient energy for driving the resonance of said resonator, and the mechanical displacements of the resonator during its resonance are diminishing.

6. The communication system of claim 1, wherein said mixed signal which is transmitted to said resoswitch in a radio-frequency range from the low kHz range.

7. The communication system of claim 1, wherein marks and spaces are transmitted by modulating a carrier signal.

8. The communication system of claim 1, wherein said resonator of said resoswitch is configured for only oscillating at its mechanical resonance frequency, wherein receiving a wireless signal which is not sufficiently close to the mechanical resonance frequency of said resoswitch will not induce resonator mechanical displacements to reach the displacement amplitude in which said resonator makes contact with said output electrode.

9. The communication system of claim 1, wherein resonator within the resoswitch is configured for storing mechanical resonance energy.

10. The communication system of claim 1, wherein said resonator comprises a shuttle suspending by flexible beams connecting it to a body portion of said resoswitch.

11. A bit rate adaptive resonant switch (resoswitch) communication system, comprising:

a microelectromechanical system (MEMS) resonant switch (resoswitch) operating as a receiver;

a resonator of said resoswitch which is configured for oscillating between a first and second position, said resoswitch is conductive and connected to a voltage source, and configured for impacting against a conductive output electrode when said resonator reaches a threshold displacement, whereby charge is transferred from the resonator to the output electrode;

wherein said conductive output electrode is configured for storing a desired level of charge, wherein each instance that said resonator makes contact with the output electrode, charge is transferred through the resonator and is stored in the charge storage circuit, and whereas when contact is not being made between said resonator and output electrode, then charges are being drained from said conductive output electrode to selectively ramp down the voltage level on said output electrode;

a transmitter circuit configured for wirelessly transmitting a received binary data stream to said resoswitch;

wherein said transmitter circuit is configured for receiving phase encoded (PE) data, or converting its input data to provide a PE data stream which limits the number of consecutive "0" bits to be received by said resoswitch;

a carrier oscillator of said transmitter circuit is configured for generating a carrier frequency which matches the mechanical resonance frequency of said resoswitch;

a mixer of said transmitter circuit that is configured for using the PE data stream as a modulation envelope for the carrier frequency and generating a mixed signal with marks and spaces which is transmitted to said resoswitch;

wherein said transmitter circuit is configured for generating an extended length first '1' input at the start of receiving a new binary data stream to be communicated to said resoswitch;

wherein said resoswitch and said transmitter circuit are configured for interoperating in said system to harness stored mechanical resonance energy of said resoswitch to reduce its required switching energy, and to adapt to higher bit rates of the transmitter circuit by using an increased Quality (Q) factor of said resoswitch to extend the duration of resonator oscillation to span the length of any '0' level input, so that sufficient stored mechanical resonance energy is still present in said oscillating resonator when the next '1' level input is received, whereby resonator oscillation more rapidly reaches a displacement amplitude in which said resonator then makes contact with said output electrode; and wherein said transmitter circuit and said resoswitch can operate at higher bit rates because each transmission does not incur delays in ramping up resonator oscillation displacement from a static condition when receiving a '1' input and awaiting after a '0' input for the resonator to return to a static displacement state.

12. The communication system of claim 11, wherein said resoswitch is configured to respond to mark periods during which sinusoidal resonance of said resonator is being accentuated as the mechanical displacements of said resonator as it resonates reach the displacement threshold and said resonator begins impacting said output electrode.

13. The communication system of claim 11, wherein upon receiving a space input, there is insufficient energy for driving resonance displacements of said resonator, and the mechanical displacements of said resonator during its resonance are diminishing.

14. The communication system of claim 11, wherein said mixed signal which is transmitted to said resoswitch is in a radio-frequency range from the low kHz range.

15. The communication system of claim 11, wherein said marks and spaces are transmitted by modulating a carrier signal.

16. The communication system of claim 11, wherein said resonator of said resoswitch is configured for only oscillating at its mechanical resonance frequency, wherein receiving a wireless signal which is not sufficiently close to the mechanical resonance frequency of said resoswitch will not induce resonator mechanical displacements to reach the displacement amplitude in which said resonator makes contact with said output electrode.

17. The communication system of claim 11, wherein said resonator within said resoswitch is configured for storing mechanical resonance energy.

18. The communication system of claim 11, wherein said resonator comprises a shuttle suspending by flexible beams connecting it to a body portion of said resoswitch.

19. A method of controlling a vibrating element within a structure, comprising:

receiving an input for inducing a movable element within a mechanical structure to resonate at a resonant frequency with increasing mechanical displacements until this resonance reaches a threshold level of displacement in establishing impacting contacts with an output electrode element of the mechanical structure;

applying a voltage at the movable element, wherein said voltage is applied from said movable element to the output electrode element in response to said impacting contacts;

wherein said mechanical structure is configured for storing resonance energy;

configuring the mechanical structure so that a time period required for the movable element to change from a static state into sufficient resonance to begin impacting the output electrode element, or change from the sufficient resonance for impacting the output electrode element back to a static state, is of a longer duration than a time period required to charge or discharge the output electrode element; and pre-energizing said movable element into a resonant state in which mechanical energy is stored and utilizing this stored mechanical energy to shorten the amount of time required for the movable element to re-establish impacting contact with an output electrode element after a period in which the moveable element displacement is insufficient for making impacting contacts with the output electrode.

20. The method of claim 19, wherein the pre-energizing of said movable element into a resonant state is performed in response to transmitting an extended length first '1' input at the start of receiving a new binary data stream to be communicated to mechanical structure.

* * * * *